Figure 1:
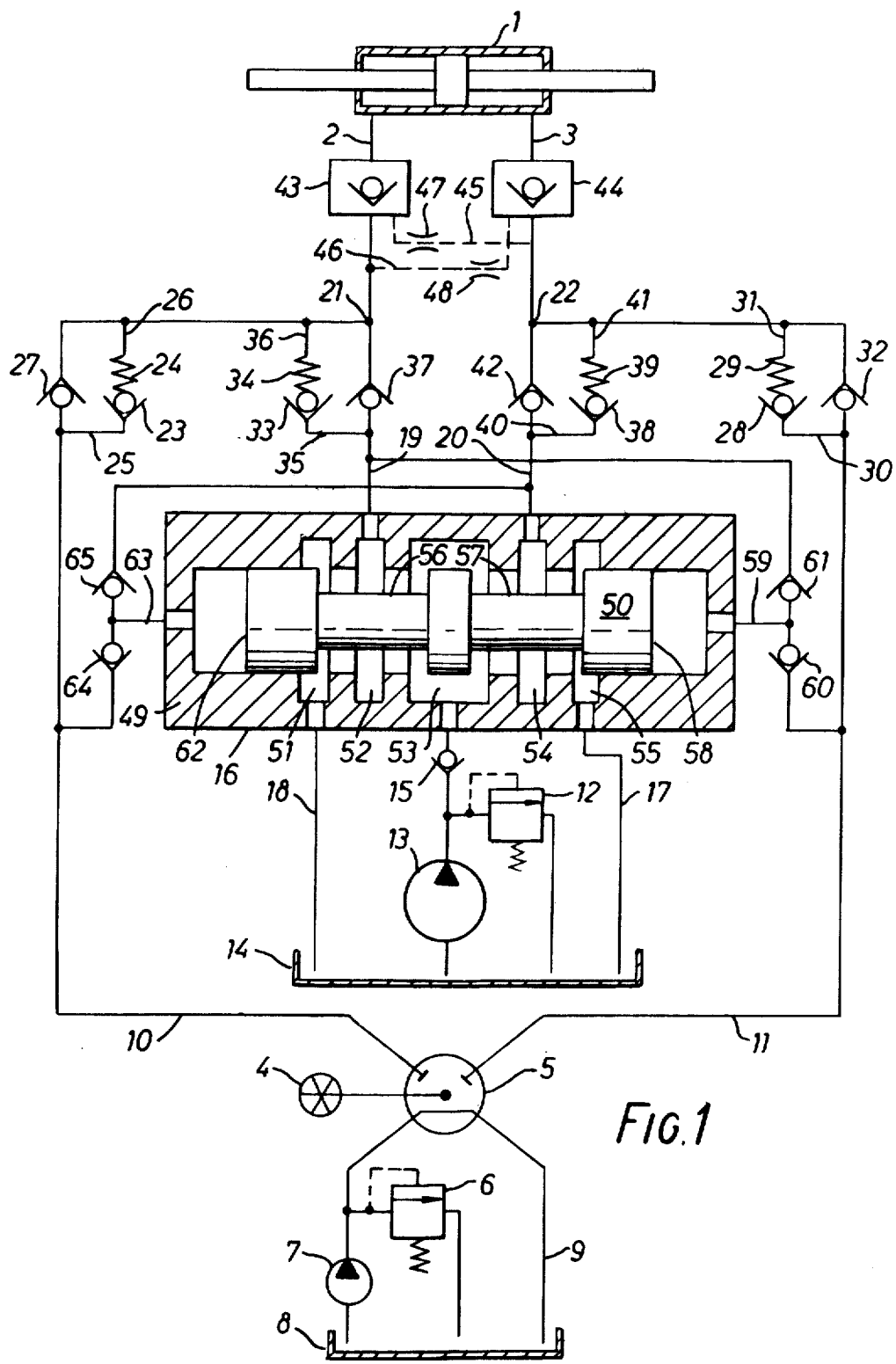

United States Patent [19]

Baatrup et al.

[11] 4,052,929
[45] Oct. 11, 1977

[54] HYDRAULIC CONTROL MEANS, ESPECIALLY A STEERING MEANS

[75] Inventors: Johannes Vagn Baatrup, Sonderborg; Thorkild Christensen, Nordborg, both of Denmark

[73] Assignee: Danfoss A/S, Nordborg, Denmark

[21] Appl. No.: 588,623

[22] Filed: June 20, 1975

Related U.S. Application Data

[63] Continuation of Ser. No. 438,004, Feb. 6, 1974, abandoned.

[30] Foreign Application Priority Data

Feb. 7, 1973 Germany .............................. 2305798

[51] Int. Cl.² ........................................ F15B 13/042
[52] U.S. Cl. ........................................ 91/29; 91/433
[58] Field of Search ............... 91/31, 433, 6, 29, 447; 137/596.14, 596.15, 596.18; 60/428, 405; 180/79.2 R

[56] References Cited

U.S. PATENT DOCUMENTS

| 2,536,965 | 1/1951 | Taylor | 137/625.66 |
|---|---|---|---|
| 2,931,389 | 4/1960 | Moog, Jr. et al. | 91/433 X |
| 3,015,317 | 1/1962 | Buchanan et al. | 137/625.62 |
| 3,213,886 | 10/1965 | Pearne | 91/447 X |
| 3,225,786 | 12/1965 | Elliot | 91/447 X |
| 3,463,260 | 8/1969 | Baines et al. | 180/79.2 R |
| 3,561,488 | 2/1971 | Byers | 137/625.62 |
| 3,564,848 | 2/1971 | Baatrup et al. | 180/79.2 R |
| 3,595,264 | 7/1971 | Martin | 91/420 X |
| 3,799,200 | 3/1974 | Tipton | 91/433 |

FOREIGN PATENT DOCUMENTS

| 962,968 | 7/1964 | United Kingdom | 91/31 |

*Primary Examiner*—Irwin C. Cohen

[57] ABSTRACT

The invention relates to a hydraulic control apparatus of the type used in vehicle steering systems. In all such systems there is a reversible type hydraulic motor connected to the steering linkage. The motor has complementary expansible chambers. With the use of control means pressurized fluid is selectively delivered to one chamber which is caused to expand concomitantly with the collapsing of the other chamber from which fluid is returned to a sump. There is provided in the control and power circuit throttle valves having respective opening positions which correspond to the pressure difference on both sides of the valves. Between the passages which extend to the two control circuit throttle valves is a pressure comparator which is operable to vary the pressure upstream of the power circuit throttle valve in proportion to the pressure upstream of the control circuit throttle valve.

2 Claims, 5 Drawing Figures

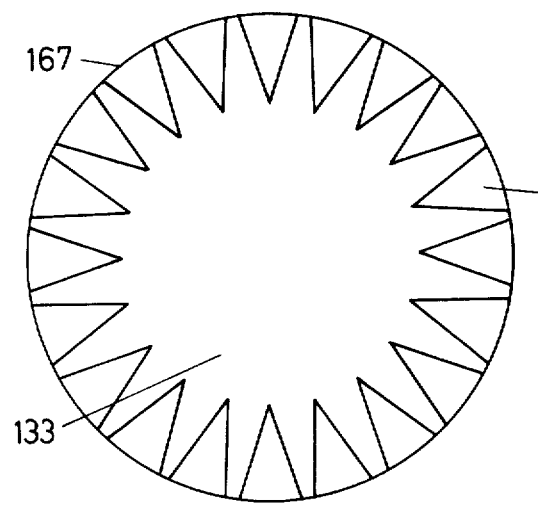
Fig. 4
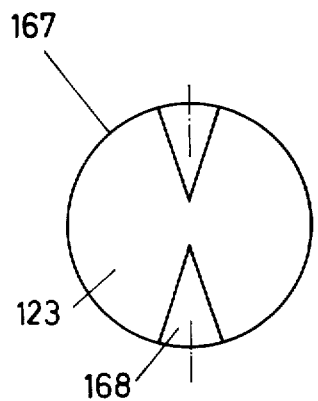
Fig. 3
Fig. 5
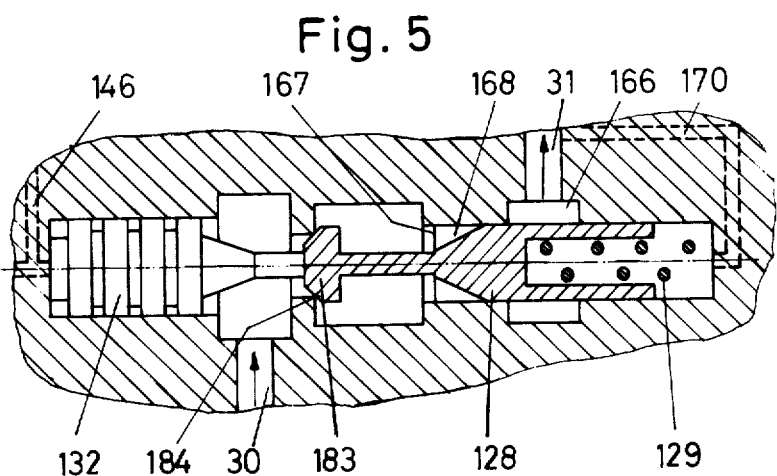

HYDRAULIC CONTROL MEANS, ESPECIALLY A STEERING MEANS

This application is a continuation application os Ser. No. 438,004, filed Feb. 6, 1974, and now abandoned.

The invention relates to a hydraulic control means, especially a steering means, having a motor to which pressurized fluid is supplied both by way of a control circuit, provided with a quantity-adjusting device, and a power circuit having a valve arrangement which determines the quantity in the power circuit in dependence upon the quantity in the control circuit.

A hydraulic control means of this kind is known (U.S. Pat. No. 3,561,488) in which there are provided, on a valve slide along a length of the peripheral surface that cooperates with an annular groove formed in the casing and leading to the motor, two outlet cross sections, namely a small cross section connected to the control circuit and a larger cross section connected to the power circuit. Since the two cross sections vary proportionally to each other there is created a flow amplifier in which the total quantity stands in an approximately proportional relationship to the control quantity. Furthermore, not only is the pressurized fluid in the power circuit passed to the motor but also the pressurized fluid in the control circuit, and this leads to an increase in the amplification factor as compared with control means in which the control quantity is used only for control purposes.

The object of the present invention is to provide a hydraulic control means of the initially-described kind in which there is greater freedom of choice as regards the magnitude of the amplification factor, and in which this factor can be also varied as required in dependence upon the control quantity and in accordance with a selectible function.

According to the invention, this object is achieved in that there is provided in the feed of the control circuit and of the power circuit a throttle valve, the opening positions of each of which valves stand in a prescribed relationship to the pressure difference on both sides of the valve, and in that there is provided between the pipes running to the two control circuit throttle valves a pressure comparator which varies the pressure upstream of the power circuit throttle valve in proportion to the pressure upstream of the control circuit throttle valve.

In this control means the control circuit throttle valve moves into a particular opening position and thus adjusts to a prescribed drop in pressure in dependence upon the selected control quantity. The pressures downstream of the throttle valves are the same because of the common connection with the motor. The pressures upstream of the valves stand in a predetermined relationship to each other, e.g. 1 : 1, on account of the use of the pressure comparator. Consequently, a specific pressure difference is created on both sides of the control circuit throttle valve. This pressure difference leads to a specific opening position. The power quantity that flows through at that point therefore stands in a prescribed relationship to the control quantity.

The particular advantage of the system resides in the fact that the control circuit throttle valve and the power circuit throttle valve are linked to each other only hydraulically but not mechanically. This leads to simplifications in the design of the control means. In particular however greater possibilities as regards the choice of the amplification factor are provided since when for example the two throttle valves each have a valve slide, not only is it possible for their diameters and the number or size of the flow cross-sections distributed over the periphery to be varied, but the two slides are also able to execute a different axial movement. Use can also be made of valve springs having differing characteristics, e.g. of a spring having a linear characteristic and a spring having a non-linear characteristic, so that the transmission ratio varies in dependence upon the control quantity.

In the case of a reversible motor it is preferred to provide a throttle valve in the two motor connecting pipes of both the control circuit and the power circuit, and to associate with at least each power circuit throttle valve a device which opens the particular return path. In this way the mechanically independent throttle valves can be simply connected in at a suitable point in the four pipes of the control and power circuit that lead to and from the motor, although they are intended to open in the feed direction because of their being controlled in dependence upon pressure.

For example, the return path opening devices may each consist of a nonreturn valve connected in parallel with the throttle valve.

In a preferred embodiment however, the return path opening devices are each constituted by a setting device which acts on the closure member of the associated throttle valve and opens this valve under the effect of the pressure in the other motor connecting pipe. This positive opening action in the return pipe therefore always takes place when there is pressure in the supply pipe. When the motor is loaded in its direction of movement by an external force there occurs an accelerating movement (overrun) as a result of which the feed pressure drops and the return pressure rises. This results in reduced loading of the setting device, and the throttle valve in the return pipe closes a little; this throttling action offsets the effect of the external pressure.

A particularly simple arrangement is achieved if the throttle valves have valve slides which by a shoulder each override an opening, are loaded at both end-faces by the pressure upstream and downstream of the valve, and are also loaded in the closing direction by a spring. Each spring determines the opening position of the valve at a particular flow quantity or at a particular difference in pressure on the two sides of the valve.

Preferably, axially extending throttle slots begin at the shoulder. These may have a preferably triangular cross-section which tapers in the direction away from the shoulder.

In order to obtain the greatest possible amplification factor, the power circuit throttle valve may have a spring which permits a greater axial displacement at the same drop in pressure as at the control circuit throttle valve.

Each of the setting devices for opening the return path can be formed by a piston, the connecting pipe to the pressure comparator terminating between the piston and the valve slide, the free end-face of the valve slide communicating with the associated motor connection, optionally by way of a flow-restricting point, and the free end-face of the piston communicating with the other motor connection, optionally by way of a flow-restricting point. In this arrangement, each valve slide is normally acted upon by the pressure-drop upstream and downstream of the valve. During reverse operation however, opening occurs under the effect of the pressure-drop at the motor. Opening occurs in a particularly reliable manner if the cross-section of the piston is greater than that of the valve slide.

It is desirable that the motor should not be able to move under the effect of external load when in the non-operating position. This can be achieved by the seal caused by a normal slide throttle valve in the connecting pipes. A particularly tight seal is obtained however if each throttle valve also has a disc valve, the disc of which if fitted on the valve slide in such a way that the disc valve will have opened before the valve slide establishes the connection with the motor.

In a preferred embodiment, the pressure comparator is part of a reversing valve for the power circuit that is actuated by the pressure in the control circuit. A simple construction is achieved by this double function.

In accordance with a further feature of the invention, the pressure comparator may have a slide which forms a throttle disposed downstream of the feed pump, a first pressure face, exposed to the pressure upstream of the control circuit throttle valve, and a second pressure face, which is exposed to the pressure upstream of the power circuit throttle valve, is preferably the same size as the first pressure face and acts in the opposite direction. A pressure comparator of this kind also acts as a reversing valve.

Preferably, the pressure comparator slide has only two pressure faces each of which is acted upon, by way of a first non-return valve, by the pressure upstream of the control circuit throttle valve associated with one of the motor connections, and, by way of a second non-return valve, by the pressure upstream of the power circuit throttle valve associated with the other motor connection. If the control quantity changes its direction of flow, the pressure faces automatically change their function.

In a further advantageous arrangement, the pressure comparator slide has two concentric blind-end bores which each communicate at their inner ends with one of the two annular operating grooves of the slide and each accommodate a pin which is guided in a bore in the casing, which bore communicates with the pipe upstream of each control circuit throttle valve. This results in a very small displacement volume for displacing the pressure comparator-reversing valve. Consequently the lost-motion distance that the device for adjusting the control quantity has to travel before displacement of the motor occurs is small.

In this arrangement the pin is preferably made of two parts, one of which is guided in the blind-end bore and the other in the bore in the casing. This permits relatively large manufacturing tolerances as regards the concentricity of the pressure comparator slide, the bore that accommodates it, the blind-end bore and the bore in the casing.

Figure 2:
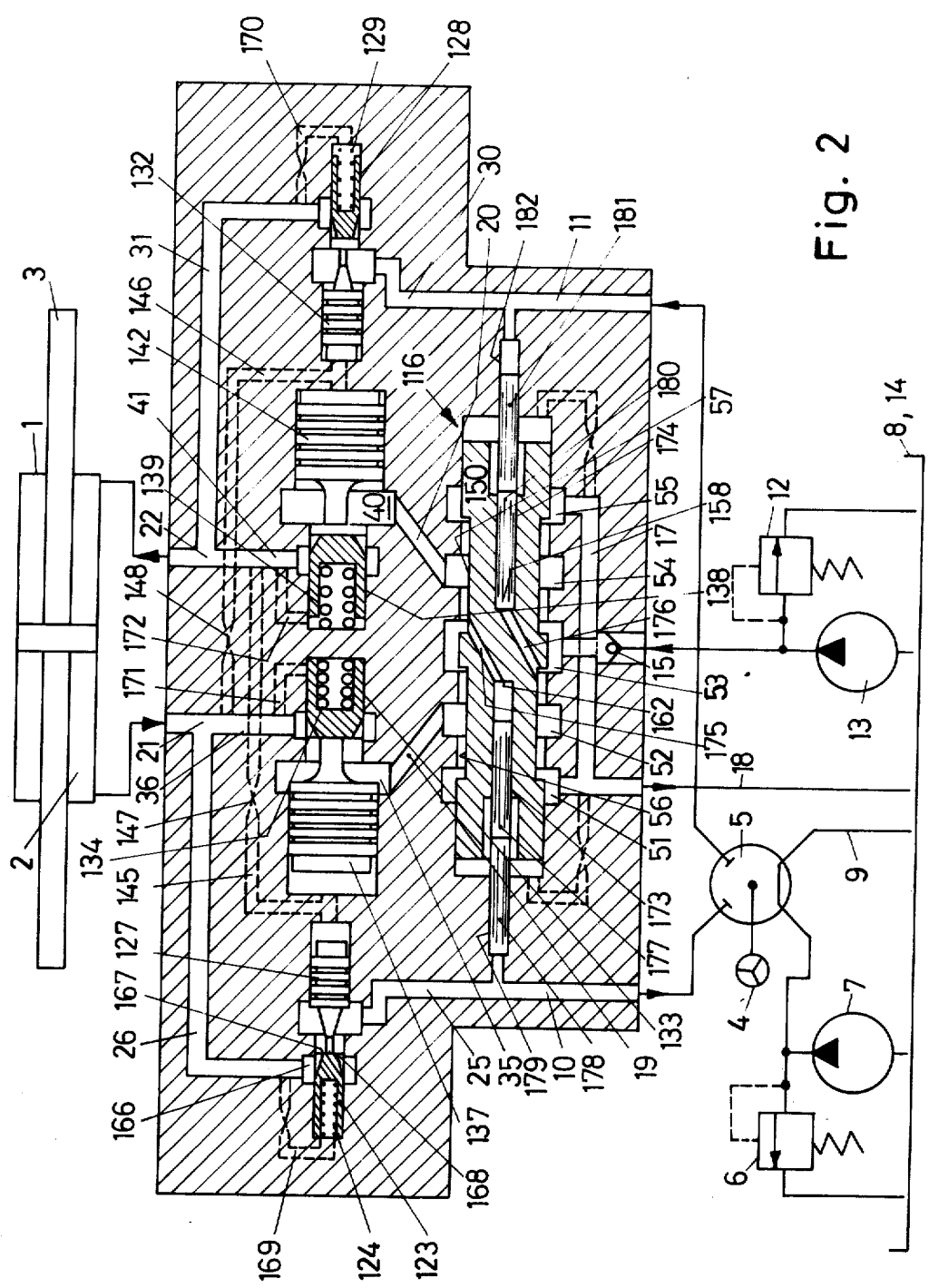

The invention will now be described in greater detail by reference to the embodiments illustrated in the drawing, in which:

FIG. 1 is a diagrammatic illustration of a first embodiment of the invention,

FIG. 2 in a diagrammatic illustration of a second embodiment of the invention,

FIG. 3 shows, on a greater scale, an end view of a control circuit throttle valve, FIG. 4 shows, on a larger scale, an end view of a power circuit throttle valve, and FIG. 5 shows on a larger scale, another form of construction of a throttle valve.

In the embodiment illustrated in FIG. 1, there is provided a motor 1 having two connecting pipes 2 and 3. The motor is operated with the aid of a steering wheel 4 which displaces a device 5 for adjusting the control quantity. This device can be of normal construction such as described for example in U.S. Patent Specification Re 25 126. A control pump 7, protected by an excess-pressure regulator 6, delivers pressurized fluid from a tank 8. Depending upon the position of the device 5, this pressurized fluid passes directly back to the tank by way of a return pipe 9, or the motor 1 by way of one of the control pipes 10 and 11, the other control pipe acting as a return pipe. Furthermore, there is provided a feed pump 13 which is likewise protected by an excess-pressure regulator 12 and supplies pressurized fluid from a tank 14 to a reversing valve 16 through a non-return valve 15. Depending upon the position of the reversing valve, the pressurized fluid is returned directly to the tank 14 by way of one of the return pipes 17 and 18, or to the motor 1 by way of one of the power pipes 19 and 20, the other power pipe acting as the return pipe. The fluids in the control circuit and the power circuit are brought together and separated at points 21 and 22 respectively.

Provided in the control pipe 10 is a control circuit throttle valve 23 which is loaded by a spring 24 and is controlled in dependence upon the pressure difference in the pipe sections 25 and 26 upstream and downstream respectively of this valve. Furthermore, this control circuit throttle valve 23 is bridged by a non-return valve 27 which opens in the opposite direction. The same arrangement is used in the case of a control circuit throttle valve 28 having a spring 29 and disposed between the pipe sections 30 and 31, this valve 28 also being bridged by a non-return valve 32. In a similar manner a power circuit throttle valve 33 with a spring 34 is disposed between two pipe sections 35 and 36, this valve being bridged by a non-return valve 37, and likewise a second power circuit throttle valve 38 with a spring 39 is disposed between the pipe sections 40 and 41 and is bridged by a non-return valve 42.

A cut-off valve 43 is provided in the connecting pipe 2, and a cut-off valve 44 in the connecting pipe 3. Both operate as simple non-return valves which open in the direction of the motor 1. However, they are also brought into the open position by pulse lines 45 and 46 respectively, each having a flow-restricting point 47 and 48 respectively, when the other connecting line is under pressure.

The pressure comparator valve 16 has a casing 49 and a slide 50 which is shown in its neutral position. The casing 49 has five annular grooves 51–55 which are connected respectively to the return pipe 18, the power pipe 19, the feed pump 13, the power pipe 20 and the return pipe 17. The slide 50 has two annular working grooves 56 and 57 which, in the non-operating position, extend sufficiently over the annular grooves 51, 53 and 55 to cause the pressurized fluid delivered by the feed pump 13 to be returned to the tank 14 through a by-pass. If the slide 50 is displaced from the median position, the cross-sections over which the grooves are in register change, and a part of the pressurized fluid dependent upon the position of the slide flows through the motor 1, and only the remaining part is returned directly to the tank.

The slide 50 has a first pressure face 58 which, by way of a pipe 59 and a first non-return valve 60, communicates with the control pipe 11, and by way of a second non-return valve 61, with the power pipe 19. Also provided is a second pressure face 62 which, by way of a pipe 63 and a first non-return valve 64, communicates with a control pipe 10, and by way of a second non-return valve 65, with the power pipe 20.

This hydraulic control means operates in the following manner: if the device 5 for adjusting the control quantity is so set that a particular control quantity flows through the pipe 11, the control circuit throttle valve 28 opens to an extent corresponding to this quantity. The pressure in the control pipe 11 is passed on through the non-return valve 60 to the pressure face 58 of the reversing valve slide 50. The slide 50 moves to the left. Pressurized power fluid therefore passes into the power pipe 20. Since the pressure of this fluid acts on the pressure face 62 by way of the non-return valve 65, the slide 50 finally occupies the position in which it keeps the pressure in the power pipe 20 equal to the pressure in the control pipe 11. Since the pressure in the pipe sections 31 and 41 is the same, the power circuit throttle valve 38 is subjected to the same pressure differential as the control circuit throttle valve 28. The power circuit throttle valve 38 therefore opens to a precisely defined extent which stands in a particular relationship to the control quantity, generally a proportional multiple thereof. The combined control and power quantities pass through the cut-off valve 44 in the feed connecting pipe 3 to one side of the motor 1. As a result of the pressure obtaining in the connecting pipe 3, the cut-off valve 43 in the return connecting pipe 2 is also opened. The fluid displaced from the motor 1 is divided at the point 21 and part of it flows through the non-return valve 37 and the reversing valve 16 to the tank 14 and part through the non-return valve 27 and the adjusting device 5 to the tank 8. If the control quantity is increased, the power quantity increases correspondingly. If the device 5 for adjusting the control quantity is displaced in the opposite direction, so that the control quantity flows through the control pipe 10, similar conditions to those described above are established but in the opposite direction of flow.

Although both the device 5 for adjusting the control quantity and the pressure comparator 16 acting as a reversing valve have a by-pass path in the neutral position, the motor 1 is safely cut off from the power and control circuits, in this position, by the cut-off valves 43 and 44, so that an external load acting on the motor is not able to move it.

In the embodiment illustrated in FIG. 2, the same reference numerals as in FIG. 1 are used for like or similar parts. Where a part performs a similar function to the equivalent part seen in FIG. 1, it is designated by a reference numeral that is increased by 100 as compared with that of the part in FIG. 1. FIG. 2 shows an operating position in which the motor 1 is just beginning to move to the left.

In this arrangement, throttle valves 123, 128, 133 and 138 are provided in each of the control pipes 10 and 11 and the power pipes 19 and 20. Here the valve slides close an opening 166 leading to the motor when they are in the non-operating position, but each has a shoulder 167 whereby this opening can be controlled. Formed at the periphery of the slide are throttle slots 168 which taper in the direction away from the shoulder and are of triangular cross-section. FIG. 3 illustrates the arrangement of the control circuit throttle valve 123 having two such throttle slots 168, and FIG. 4 shows a throttle valve 133 for the power circuit having twenty such throttle slots 168.

When there throttle valves are disposed in the return pipe they are positively opened by the pistons 127, 132, 137 and 142 respectively. Between the slide of each valve and the piston there terminate the control pipe 10 or 11 and the power pipe 19 or 20. The pressure in each of the other connecting pipes 3 and 2 acts on the free end face of the piston through the pulse line 145 and 146 respectively. The pressure of each associated connecting pipe 2 and 3 acts on the free end face of each valve slide through the pulse lines 169, 170, 171 and 172 respectively. A flow-restricting point can also be provided in each of these pulse lines. The cross-section of each of the pistons is greater than that of the associated valve slide.

The pressure comparator 116, which also acts as a reversing valve, has a slide 150 which has two concentric blind-end bores 173 and 174. The inner ends of these bores are connected by ducts 175 and 176 to the annular operating grooves 56 and 57 of the slide 150. Guided in the blind-end bore 173 is the first part 177 of a pin, the second part 178 of which is guided in a bore 179 in the casing, which bore is connected to the control pipe 10. Guided in the blind-end bore 174 is the first part of a pin 180, the second part 181 of which is guided in a bore 182 in the casing which latter bore is connected to the control pipe 11.

This arrangement results in a mode of operation which differs from that of the arrangement in FIG. 1 in the following respects. In the non-operating position, the connecting pipes 2 and 3 are completely cut off from the rest of the power and control circuits by the throttle valves 123, 128, 133 and 138. When, with the aid of the device 5 for adjusting the control quantity, such quantity is passed through the pipe 11 in the direction indicated by the arrow, the throttle valve 128 opens against the force of the spring 129. The pressure occurring in the control pipe 11 displaces the slide 150 leftwards by way of the two-part pin 180, 181. The pressure in the power pipe 20 acts as a counter-force on the pressure face 162 by way of the duct 175. The operating pressure in the pipe 20 is therefore equated with the control pressure in the pipe 11. Accordingly, the throttle valve 138 also opens to a precisely defined extent. Pressurized fluid from the control circuit and from the power circuit therefore passes jointly through the connecting pipe 3 and into the motor 1. By way of the pulse line 145, the pressure in the connecting pipe 3 acts on the free end faces of the two pistons 127 and 137. These therefore force the two throttle valves 123 and 133 into the open position. Fluid from the motor 1 can therefore flow back unrestrictedly to the tanks 8 and 14 through the connecting pipe 2 and by way of the power pipe 19 and the control pipe 10, the throttle slots in the throttle valves 123 and 133 again dividing the control quantity and the power quantity approximately in the original ratio.

If now an external force is applied to the motor is tends to move it, i.e. accelerate it to the left, then the pressure in the connecting pipe 2 rises, whereas that in the connecting pipe 3 drops. This results in the pressure equilibrium in the systems 127, 123 and 133, 137 varying so that the throttle valves move slightly in the closing direction. Consequently, the return pipe is throttled, i.e. the acceleration caused by the external force is offset.

If the external force acts in the opposite direction on the motor, the movement of the motor is delayed. The pressure in the connecting pipe 3 rises, whereas the pressure in the connecting pipe 2 drops. The rise in pressure results in a pressure increase in the control pipe 11 which leads to the slide 150 being displaced to the left and therefore to increased effectiveness of the power circuit, so that this external force is also offset.

The possibility of the motor being displaced by external forces in a direction opposite to that set at the adjusting device 5 is completely excluded since this would require the pressure in the connecting pipe 3 to be greater than the pressure in the control pipe 11 or the power pipe 20. In such power conditions, however, the throttle valves 128 and 138 are closed or will immediately close.

The control means illustrated is also suitable for emergency operation since a metering motor, normally present in the adjusting device 5, can also be driven as a pump with the aid of the steering wheel 4. Should the control pump 7 fail, the feed pump 13 can therefore be further controlled. Should the feed pump 13 or even both pumps 7 and 13 fail, emergency operation can still be maintained with the aid of the steering wheel 4 and of the metering motor in the control device 5, which motor acts as a pump. The drawing shows the flow conditions in the case of a motor moving to the left. Corresponding conditions apply in the case of a motor to be moved to the right.

FIG. 5 shows that for the purpose of intensifying the blocking action, the slide of the throttle valve 128 can also be provided with a disc 183 which co-operates with a valve seat 184. In this way there is obtained an upstream disc valve which will have opened before the throttle slots 168 are in communication with the opening 166.

In many cases it will also be possible to dispense with the return path opening devices 27, 32, 127, 132 for the control circuit, since the return path opening devices 37, 42, 137, 142 for the power circuit uncover a sufficiently large cross-section to enable the pressurized fluid supplied through the control circuit also to be carried away. However, it is then preferred to connect the two tanks 8 and 14 to each other.

In the embodiment illustrated in FIG. 2, the pressure comparator operates with a 1:1 ratio, so that the same pressure obtains upstream of the control circuit throttle valve and the power circuit throttle valve. The ratios of the control quantity to the power quantity can also be varied with the aid of other pressure ratios.

We claim:

1. A power steering assembly comprising a motor having expansible chamber means, first and second pressurized fluid source means, manually controlled rotary metering means controlling said first source means, control and power passage means extending respectively in parallel from said two source means to a junction upstream from said chamber means, pilot operated reciprocating comparator valve means in said power passage means having a pressure operated movable valve member for modulatingly controlling the flow of pressurized fluid in said power passage means to said chamber means, first branch passage means between said control passage means and a first pressure responsive portion of said comparator valve means for pilot fluid pressure biasing said valve member in an opening direction, second branch passage means between said power passage means downstream of said comparator value means and a second pressure responsive portion of said comparator valve means for fluid pressure biasing said valve member in a closing direction, first and second throttle check valves biased by resilient means respectively, in said control and power passage means between said branches and said junction, said throttle valves presenting selected resistances to flow to obtain selected predetermined flow relationships between the respective fluid flows in said control and power passage means.

2. A power steering assembly according to claim 1 wherein said resilient means of said throttle valves comprises biasing springs respectively which are structured to cause a relatively larger pressure to be developed in said control passage means than in said power passage means.

* * * * *